United States Patent [19]

McCarty

[11] Patent Number: 4,656,379
[45] Date of Patent: Apr. 7, 1987

[54] HYBRID EXCITED GENERATOR WITH FLUX CONTROL OF CONSEQUENT-POLE ROTOR

[75] Inventor: Frederick B. McCarty, San Pedro, Calif.

[73] Assignee: The Garrett Corporation, Los Angeles, Calif.

[21] Appl. No.: 810,968

[22] Filed: Dec. 18, 1985

[51] Int. Cl.$^4$ ............................................. H02K 19/12
[52] U.S. Cl. ...................................... 310/181; 310/156
[58] Field of Search ............... 310/156, 162, 179, 180, 310/181, 190, 191, 192; 322/46, 57, 59

[56] References Cited

U.S. PATENT DOCUMENTS

| | | | |
|---|---|---|---|
| 2,540,202 | 2/1951 | Haas | 322/59 |
| 2,564,320 | 8/1951 | Brainard | 322/28 |
| 2,648,044 | 8/1953 | Opel et al. | 322/59 |
| 2,767,368 | 10/1956 | Kober | 322/57 |
| 2,802,959 | 8/1961 | Powers | 310/156 |
| 3,017,562 | 1/1962 | Duane | 322/46 |
| 3,201,625 | 8/1965 | Smith et al. | 310/154 |
| 3,214,620 | 10/1965 | Smith et al. | 310/181 |
| 3,214,675 | 10/1965 | Foster | 322/46 |
| 3,396,325 | 8/1968 | Hopkins | 322/46 |
| 3,413,502 | 11/1968 | Schwab | 310/162 |
| 3,427,484 | 2/1969 | Karlby et al. | 310/181 |
| 3,443,201 | 5/1969 | Williams | 310/181 |
| 3,510,752 | 5/1970 | Raver et al. | 322/46 |
| 3,512,075 | 5/1970 | Raver et al. | 322/46 |
| 3,512,076 | 5/1970 | Larson et al. | 322/46 |
| 3,566,251 | 2/1971 | Hoglund | 322/46 |
| 4,011,479 | 3/1977 | Volkrodt | 310/181 |
| 4,015,189 | 3/1977 | Gorden | 322/46 |
| 4,035,713 | 7/1977 | Kawamoto et al. | 322/46 |
| 4,578,609 | 3/1986 | McCarty | 310/191 |

FOREIGN PATENT DOCUMENTS 516123 12/1939 United Kingdom .

Primary Examiner—Patrick R. Salce
Assistant Examiner—D. L. Rebsch
Attorney, Agent, or Firm—Leslie S. Miller; Albert J. Miller

[57] ABSTRACT

An electrical machine utilizes a consequent pole rotor with a polyphase stator assembly and a control coil to produce a widely variable voltage output. Either constant-speed—variable-voltage performance, or variable-speed—constant-voltage performance may be easily achieved by varying the magnitude and level of D.C. current supplied to the control coil. Single and double rotor embodiments are disclosed, with cogging being easily suppressible in the double rotor embodiments.

34 Claims, 20 Drawing Figures

| CONDITION | CONTROL FLUX | CONTROL MMF | MAGNET FLUX |
|---|---|---|---|
| $V = V_{PM}, \phi_P = \phi_M$ | $\phi_C = 0$ | $F_C = \phi_M R_{EP} + F_L$ | $\phi_M = (F_M - 2F_L)/(R_{EP} + R_{EM} + R_M)$ |
| $V > V_{PM}, \phi_P = 1.3\phi_M$ | $\phi_C = .3\phi_M$ | $F_C = 1.3\phi_M R_{EP} + F_L$ | $\phi_M = (F_M - 2F_L)/(1.3 R_{EP} + R_{EM} + R_M)$ |
| $V < V_{PM}, \phi_P = 0$ | $\phi_C = -\phi_M$ | $F_C = F_L$ | $\phi_M = (F_M - 2F_L)/(R_M + R_{EM})$ |
| $V = 0., \phi_P = -\phi_M$ | $\phi_C = -2\phi_M$ | $F_C = -(\phi_M R_{EP} - F_L)$ | $\phi_M = (F_M - 2F_L)/(R_{EM} - R_{EP} + R_M)$ |

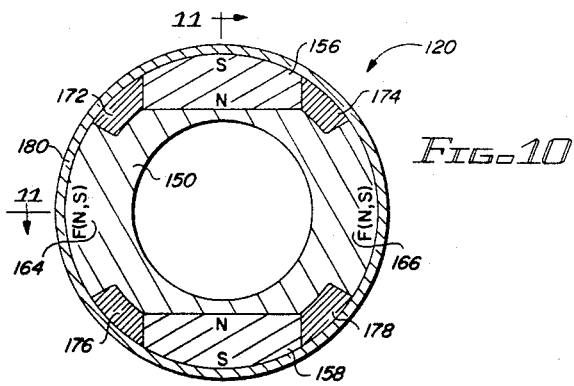
FIG-10
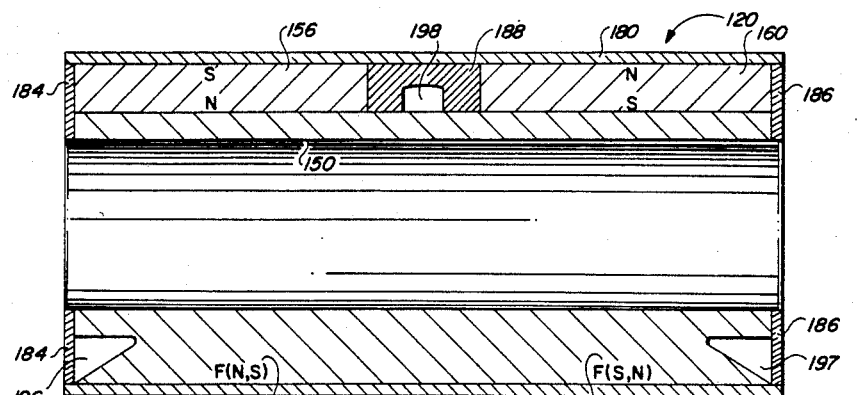
FIG-11
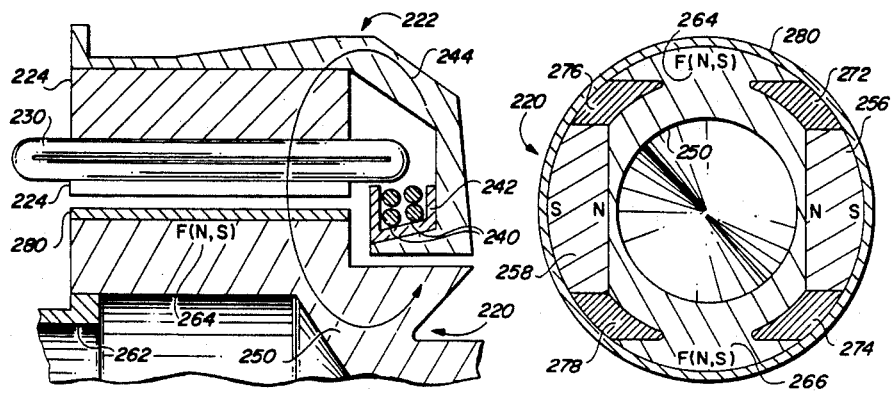
FIG-13
FIG-14

HYBRID EXCITED GENERATOR WITH FLUX CONTROL OF CONSEQUENT-POLE ROTOR

BACKGROUND OF THE INVENTION

1. Field of the Invention

The present invention relates generally to an electrical machine for generating an output voltage, and more particularly to a generator having a permanent magnet rotor, which generator is capable of producing a voltage output which is variable over a large range in a machine that is relatively compact, efficient, and economical both in construction and in operation.

There are two basic types of generators which may be categorized by the way in which they are excited, or by the way poles are provided in the rotor. The first type of generator is the electromagnetic (EM) generator, which is excited by a direct current supplied to field coils located on the rotor, thereby producing a flux in the ferromagnetic poles of the rotor. Electromagnetic generators typically use brushes and slip rings to provide field current to the field coils located on the rotor poles. Brush-type designs are generally seen as undesirable in many applications today, since they are subject to maintenance required by normal wear, as well as for a number of other reasons mandated by the particular application.

While electromagnetic generators can be made brushless by the use of special equipment carried on the rotor (generally a solid-state rectifier fed by an exciter armature) as well as additional stationary coils (to generate a stationary field caused by direct current excitation of the additional stationary coils), the complexity of such a system is undesirable. In addition, such a system is also both expensive and unduly large in size, and the use of rotor windings result in thermal and structural problems well known in the art. Another approach used to make an electromagnetic generator brushless requires the employment of a longer magnetic circuit with inferior magnetic coupling. This approach results in a large weight penalty being incurred, and is therefore undesirable except in the case of very small generators and a limited number of special applications.

The main advantage of an electromagnetic generator is that it may easily be controlled to vary the AC output voltage of the generator. This advantage is particularly significant in situations requiring accurate control of the output voltage to compensate for changes in machine speed or load, or for changes in temperature.

The second type of generator is the permanent magnet (PM) generator, which uses permanent magnets mounted on the rotor to provide the poles on the rotor. Permanent magnet generators have a compact, rugged rotor without windings, so the thermal and structural problems of rotor windings are completely avoided. A permanent magnet generator is also intrinsically brushless, a significant advantage over electromagnetic generators.

Unfortunately, it is quite difficult to achieve a widely variable output voltage from a permanent magnet generator. The excitation of a permanent magnet generator is fixed by the properties of the permanent magnet material used in the rotor. In order to control output voltage of the permanent magnet generator, it has been necessary to greatly increase the complexity and the weight of the machine.

If only a small range of variation in the output voltage of the machine is required (on the order of 15% to 20%), then an electrical scheme which saturates or shunts a portion of the ferromagnetic circuit may be employed. When a larger degree of control is necessary (as in the case where rotor speed may vary by a factor of two), the only option has been a mechanical regulation scheme which varies the magnetic coupling of the magnets with respect to the stator or with respect to one another.

Such control schemes for permanent magnet generators are parasitic. An additional element of mechanical or electrical nature has been added, which element can reduce intrinsic excitation flux but cannot increase it. The result is a machine with a greatly reduced efficiency to weight ratio, with significantly increased costs of manufacturing and operating the machine.

It may therefore be appreciated that it is desirable to have all the advantages and features of a permanent magnet generator, with the additional feature of voltage regulation such as that in an electromagnetic generator. The machine should be of the least possible size and weight, and should be capable of highly efficient operation and economical construction. Finally, it must not be parasitic in operation, but rather selectively decrease or increase intrinsic excitation flux.

SUMMARY OF THE INVENTION

The present invention utilizes both permanent magnet excitation and electromagnetic excitation in a light weight, brushless machine. This combination of excitations in a single machine may be referred to as a hybrid excited generator. In the preferred embodiment the hybrid excited generator is composed of two permanent magnet machines having their rotors connected together by a magnetic shunt and in closely adjacent proximity. In the area between the ends of the two permanent magnet machine stators, a field coil like those used in certain electromagnetic machines is installed.

This electromagnetic field coil functions essentially as a control coil for varying the voltage output from the hybrid excited machine. The coil is wound on a bobbin, and is wound around the axis of the rotor of the hybrid excited machine. An essentially cylindrical ferromagnetic frame closely surrounding the two permanent magnet machine stators provides a flux shunt through which the control coil changes flux linkage between the various components.

The excitation flux of the hybrid excited generator may thus be varied by varying the direction and magnitude of the current flowing in the control coil, resulting in a variance in output voltage generated by the machine. The control flux (the electromagnetic portion of the excitation supplied by the control coil) is implemented by the use of a rotor design referred to as a consequent pole rotor. This rotor design is described in detail in my copending U.S. patent application Ser. No. 810,967, filed concurrently with the present application and assigned to the assignee of the present application, which application is hereby incorporated herein by reference.

In particular, the consequent pole rotor has a profound magnetic assymetry which allows the use of electromagnetic excitation from the control coil. The consequent pole rotor has high reluctance permanent magnet poles which excite low reluctance ferromagnetic poles at alternating pole locations. The electromagnetic excitation from the control coil can therefore change the flux in the magnetic poles only a very small amount compared to the change affected in the ferromagnetic poles by the electromagnetic excitation. This assymmetry is essential to controlling the output voltage of the hybrid excited machine of the present invention. The consequent pole rotor works particularly well with high energy product materials such as samarium-cobalt and neodymium-iron-boron.

Two types of double rotors are disclosed in the present application, with the rotors working equally well in either case. Additionally, two single section machines are also disclosed, one of which is radial and the other of which is axial in flux coupling with the respective stators.

It may thus be appreciated that the present invention presents an advantageous hybrid excited generator having the advantages of both electromagnetic excited generators and permanent magnet generators, with the disadvantages of neither. The hybrid excited generator is brushless and produces a voltage output which is variable over a wide range. The machine is relatively compact and light in weight, and economical both in construction and in operation.

DESCRIPTION OF THE DRAWINGS

These and other advantages of the invention are best understood with reference to the drawings, in which:

FIG. 10 is an end view of an alternate embodiment for the rotor of the machine shown in FIG. 1 with the end rings removed;

FIG. 11 is a cross-sectional view of the rotor of FIG. 10;

FIG. 13 is a cutaway view of an alternate embodiment of the present invention showing the construction of a radially configured hybrid excited machine comprising one permanent magnet machine in tandem with an electromagnetc machine field or control coil;

FIG. 14 is a cross-sectional view of the rotor of the machine shown in FIG. 13;

DETAILED DESCRIPTION OF THE PREFERRED EMBODIMENT

Figure 1:
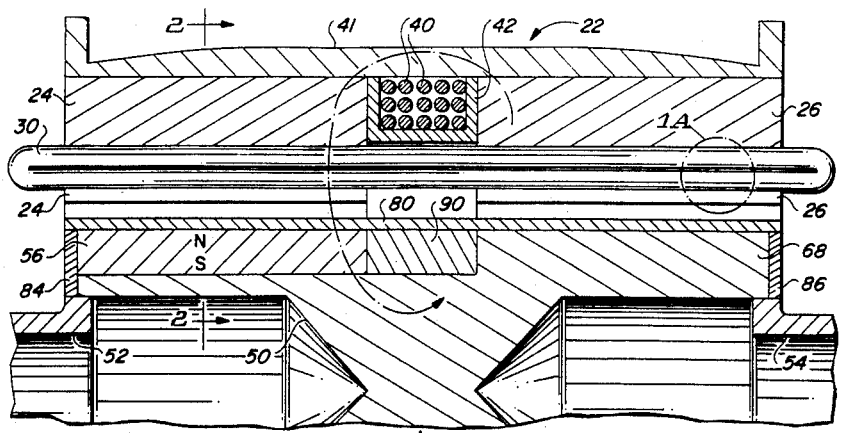
FIG. 1 is a cutaway view of the preferred embodiment of the present invention showing the construction of a hybrid excited machine comprising the two permanent magnet machines in tandem with an electromagnetic machine field or control coil located between the permanent magnet machine stators.

The preferred embodiment of the present invention is illustrated in FIG. 1, in which a rotor 20 is rotatably mounted inside a stator 22. The stator 22 includes two conventional polyphase winding stators, defined by a right stator core 26 and a left stator core 24. Both the right stator core 26 and the left stator core 24 are essentially cylindrical with a series of radially inwardly extending T-shaped stator teeth 28, as shown in the cross-sectional view of the left stator in FIG. 2. Between the stator teeth 28 are slot areas into which the stator windings 30 are wound. In the machine illustrated in FIGS. 1 and 2, for example, there are 24 slot areas between the 24 teeth 28. The example used is for a four pole machine, but it should be noted that it is equally applicable to machines with other numbers of poles.

Figure 1A:
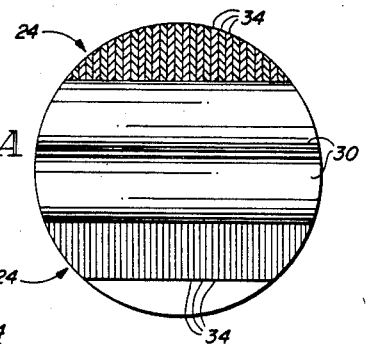
FIG. 1A is an enlarged view of a portion of the right stator showing the laminated construction of the right stator core.

The right stator core 26 and the left stator core 24 are typically constructed of a plurality of laminations of electrical steel, which stator laminations 34 are shown in FIG. 1A. It should be noted that the stator windings 30 are shown schematically in the drawings, and that they are conventional, as is well known in the permanent magnet machine art. One detail not illustrated in the drawings is the presence of insulation, both between the stator windings 30 and the stator cores 24, 26, and between the stator windings laid into a single slot area between stator teeth 26.

Figure 2:
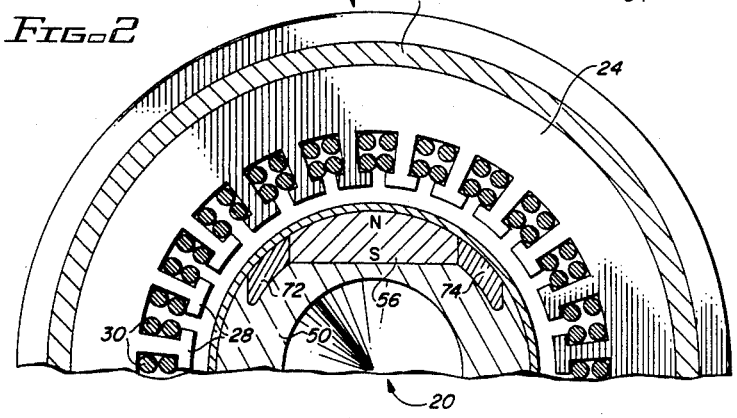
FIG. 2 is a cross-sectional view of the machine of FIG. 1 showing the left stator configuration.

It should be noted that the stator windings 30 in the preferred embodiment illustrated in FIGS. 1 and 2 passes straight through between the left stator core 24 and the right stator core 26. This configuration is possible because of the configuration of the rotor 20, which will be discussed in detail below. It is important to keep in mind that the stator windings 30 may also mechanically jog between the left stator core 24 and the right stator core 26, and such a configuration will be discussed as an alternate embodiment in conjunction with FIGS. 10 and 11. Finally, it is also possible that the stator windings 30 in the left stator core 24 and the right stator core 26 may be externally connected, if it is desirable to do so to simplify construction of the machine.

The left stator core 24 and the right stator core 26 are mounted around the same axis (the axis of the rotor 20), but separated from each other by a space into which a control coil 40 mounted on a bobbin 42 is mounted. The bobbin 42 is made of non-magnetic, non-conductive material, preferably a high temperature engineering plastic such as Torlon, which bobbin 42 fits between the left stator core 24 and the right stator core 26. The inner diameter of the bobbin 24 is large enough to prevent interference with the portion of the stator windings 30 extending between the left stator core 24 and the right stator core 26.

The control coil 40 is wound around the axis of the rotor 20 onto the bobbin 42, and is selectively supplied with a D.C. control current of variable magnitude and direction to generate a control flux. It should be noted that the MMF of one-half of the control coil 40 is shown schematically in FIG. 6 as $F_C$. Completing the stator 22 is a ferromagnetic frame 44, which is cylindrical and which surrounds the left stator core 24, the control coil 40, and the right stator core 26. The ferromagnetic frame functions to complete the magnetic circuit, which will be discussed in detail below.

The rotor 20 comprises two permanent magnet rotors mounted together on a single common frame, which is a ferromagnetic yoke or core 50. The rotor 20 is illustrated in FIGS. 1 and 3-5, and is a consequent pole rotor having two sets of high reluctance permanent magnet poles alternating with low reluctance ferromagnetic consequent poles, as disclosed in the above-incorporated by reference disclosure. As will become apparent later, the alternating high and low reluctance poles are critical to the operation of the present invention.

The rotor 20 thusly comprises in the example illustrated in the drawings two four pole rotors on the common ferromagnetic yoke 50. The rotors are separated, to correspond with the left and right stator cores 26, 24, which are separated by the control coil 40. Attached to and rotatably supporting the ferromagnetic yoke 50 at the ends thereof are two shaft stubs 52, 54 (FIG. 1).

A first pair of permanent magnets 56, 58 are mounted on the ferromagnetic frame 50 at one end thereof, and a second pair of permanent magnets 60, 62 are mounted at the other end thereof. Located intermediate the permanent magnets are consequent poles; consequent poles 64 and 66 are intermediate the permanent magnets 56 and 58, and consequent poles 68 and 70 are intermediate the permanent magnets 60 and 62.

Also included in the rotor 22 are damper bars made of conductive, non-ferromagnetic material. A damper bar 72 is between the permanent magnet 56 and the consequent pole 64, a damper bar 74 is between the permanent magnet 56 and the consequent pole 66, a damper bar 76 is between the permanent magnet 58 and the consequent pole 64, and a damper bar 78 is between the permanent magnet 58 and the consequent pole 66. Four similar damper bars (not shown) also are located similarly between the permanent magnets 60, 62 and the consequent poles 68, 70.

The first pair of permanent magnets 56, 68, the consequent poles 64, 66, the damper bars 72, 74, 76, and 78, and the left end of the rotor 20 are surrounded by the left end of a retaining hoop 80 made of non-ferromagnetic material. The second pair of permanent magnets 60, 62, the consequent poles 68, 70, the other four damper bars (not shown), and the right end of the rotor 20 are surrounded by the right end of the retaining hoop 80.

In addition, damper rings are used to prevent axial movement of the permanent magnets 56, 58, 60, 62 on the rotor 20. A damper ring 84 is used on the left end of the rotor 20, and a damper ring 86 is used on the right end of the rotor 20. Two additional damper rings (not shown) may be used to prevent the permanent magnets 56, 58, 60, 62 from sliding axially toward the center of the rotor, or damper spacers may be used. In the preferred embodiment, four damper spacers 88, 90, 92, and 94 are used instead of the two additional damper rings. The damper spacers 88, 90, 92, 94 are preferably touching one another. All the damper bars, rings and spacers are made of a highly conductive, non-ferromagnetic material such as aluminum.

Note that the retaining hoop 80 also covers the damper spacers 88, 90, 92, 94. In the event the two additional damper rings mentioned above were used instead of the damper spacers 88, 90, 92, 94, there would be two retaining hoops instead of the single retaining hoop 80, with each of the two retaining hoops covering one end of the rotor 20.

To understand the operation of the machine of the present invention it is important to note that the ferromagnetic poles 64, 66, 68, 70 in the rotor 20 provide a low reluctance path for the flux from the control coil 40. However, the permanent magnets 56, 58, 60, 62, creating magnet poles, present a very high reluctance (essentially the same as free space). Therefore, the electromagnetic control field provided by the control coil 40 can change the magnetic flux in the magnet poles only a small amount as compared to the change effected in the ferromagnetic poles. The control flux generated by the control coil 40 is sent through the various poles of the rotor 20, with the ferromagnetic yoke 50, the ferromagnetic frame 44, and the various poles comprising the path taken by the control flux.

This asymmetry is essential to control the output voltage of the hybrid excited generator because the control flux has the same direction in the ferromagnetic poles as in the permanent magnet poles. Thus, only the *difference* in magnitude of the control flux at these sites will affect the output voltage. Consider the magnetic circuit schematic of FIG. 6, in which $F_M$ is the intrinsic (constant) magnetizing force of one of the permanent magnets 56, 58, 60, 62; $F_L$ is the (variable) demagnetizing force of load current; $F_C$ is the (variable) magnetizing force of half the control coil 40; $\phi_M$ is the (slightly variable) flux in the magnetic poles; $\phi_P$ is the (highly variable) flux in ferromagnetic poles 64, 66, 68, 70; $\phi_C$ is the (variable) flux of the control coil 40; $R_P$ is the reluctance of the ferromagnetic poles 64, 66, 68, 70, which is approximately zero; $R_{EM}$ and $R_{EP}$ are equivalent reluctances of the stator core, teeth, airgap, hoop, and yoke, which are nonlinear functions of fluxes $\phi_M$ and $\phi_P$; $R_M$ is the (constant) reluctance of the permanent magnets 56, 58, 60, 62; and $R_R$ and $R_S$ are the reluctances of the rotor and stator shunts, respectively, which are approximately zero.

Figures 6, 7:
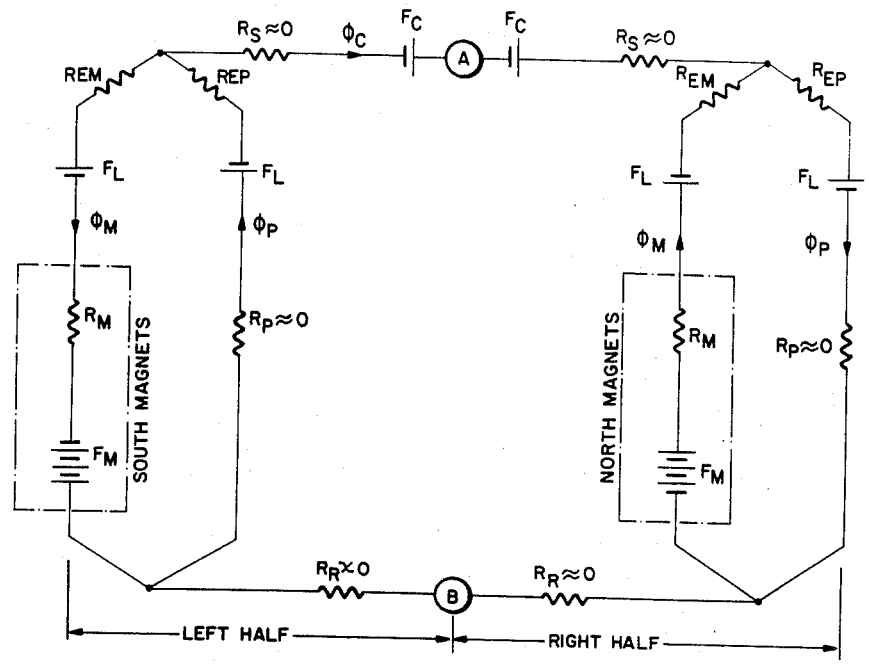
FIG. 6 is a diagram of the electrical analog of the magnetic circuit for the machine of FIG. 1.
FIG. 7 is a chart of machine output voltage V, ferromagnetic pole flux $\phi_P$, control MMF $F_C$, and magnet flux $\phi_M$ for various values of control flux $\phi_C$.
Figure 8A:
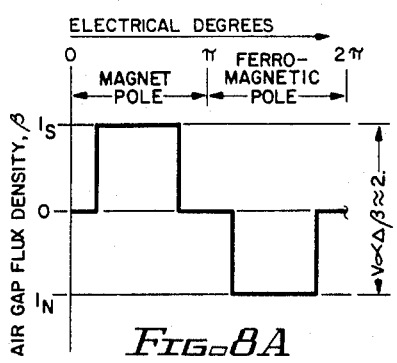
FIG. 8A is a plot of air gap flux swing for the first value of control flux $\phi_C$ in the chart of FIG. 7.
Figure 8C:
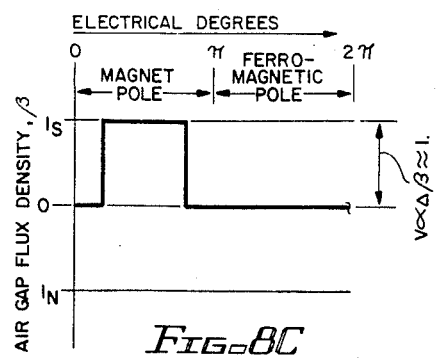
FIG. 8C is a plot of air gap flux swing for the third value of control flux $\phi_C$ in the chart of FIG. 7.
Figure 8B:
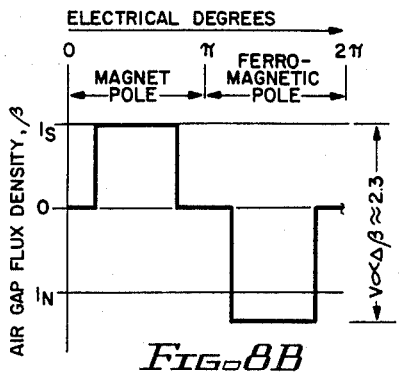
FIG. 8B is a plot of air gap flux swing for the second value of control flux $\phi_C$ in the chart of FIG. 7.
Figure 8D:
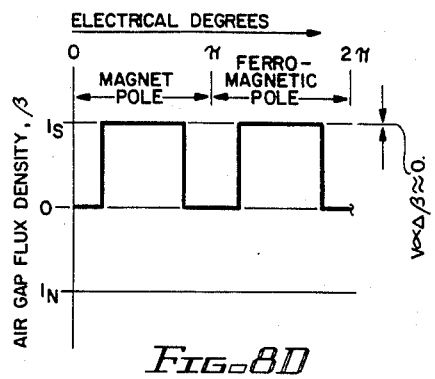
FIG. 8D is a plot of air gap flux swing for the fourth value of control flux $\phi_C$ in the chart of FIG. 7.

In FIG. 6 leakage paths for flux through and below the control coil 40 and from the rotor 20 to the stator 22 in the interpole zone between the magnets and the ferromagnetic poles has been omitted for clarity. Referring to FIG. 7 in conjunction with FIG. 6, a table is shown for various values of control flux $\phi_C$. Note that V is the output voltage of the machine, and that $V_{PM}$ is the intrinsic output voltage due to the permanent magnets, with reluctances $R_P$, $R_R$, and $R_S$ negligible in comparison to $R_M$, $R_{EM}$, and $R_{EP}$.

Referring now to FIGS. 8A, 8B, 8C, and 8D, plots of the air gap flux swing for the left half of the machine are shown for values of control flux $\phi_c$ shown in the chart of FIG. 7. Note that the interpole leakage flux is not shown in the flux density waves of FIGS. 8A, 8B, 8C, and 8D, and that the areas of iron shunts must be sufficient to carry the leakage fluxes and the control flux without saturation. Note also that the second harmonic is neutralized in the stator winding because all even harmonics induced in a coil over a magnetic pole are 180 degrees out of phase with those induced in a coil over a ferromagnetic pole when such coils are connected to be series aiding with respect to the fundamental voltage.

Figure 9:
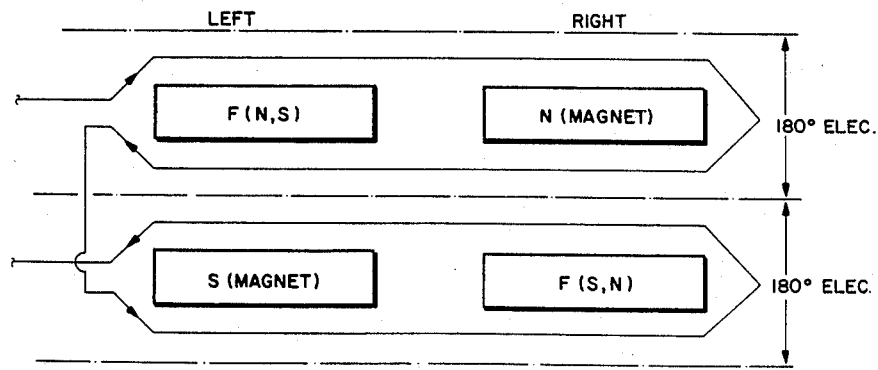
FIG. 9 is a schematic drawing showing the relationship of the magnetic poles and the ferromagnetic poles, and a typical stator conductor at maximum flux linkage of the rotor for the machine of FIG. 1.

FIG. 9 illustrates the relationship of rotor poles to a typical stator winding conductor at the maximum flux linkage position of the rotor 20.

The present invention thereby allows a wide variation in the output voltage from the machine at a given speed. It is then apparent that it is also possible to vary the control flux to maintain a given output voltage while speed of the rotor varies widely. This gives the present invention a tremendous advantage over machines previously known in the art.

An alternative embodiment using a different construction for a double rotor 120 having a ferromagnetic yoke 150 is illustrated in FIGS. 10 and 11. The rotor 120 illustrated is again a four pole rotor, but the construction described below is applicable to other rotors as well. Permanent magnets 156 and 158 are on the left end of the rotor 120 on opposite sides of the rotor 120, with their magnetic poles oriented in a common radial direction, here South pole radially outermost. Located intermediate the permanent magnets 156, 158 are consequent poles 164 and 166.

However, as may be seen in FIG. 11, the consequent pole 164 is made of a segment of the ferromagnetic yoke 150 extending across the length of the rotor 120. The left end of this section is the consequent pole 164, and the right end of this section is a consequent pole 168. The right end of the rotor has two permanent magnets 160, 162 (the latter of which is not shown), axially aligned with the permanent magnets 156, 158, respectively.

The permanent magnets 160, 162 also have their magnetic poles oriented in a common radial direction, but opposite to the orientation of the permanent magnets 156, 158. Here the permanent magnets 160, 162 are oriented with the North poles outermost. The consequent pole 168 is located between the permanent magnets 160, 162. An additional consequent pole 170 (not shown) would also be located between the permanent magnets 160, 162, and would be formed by a segment extending across the length of the rotor 120, which segment would also form the consequent pole 166.

Note that the segment forming the consequent poles 164, 168 has material removed to form lightening spaces 196, 197 at each end. This material may be removed without affecting the magnetic performance of the rotor 120 significantly. Likewise, additional lightening spaces may be provided in the segment forming consequent poles 166 and 170 (not shown).

A damper bar 172 is between the permanent magnet 156 and the consequent pole 164, a damper bar 174 is between the permanent magnet 156 and the consequent pole 166, a damper bar 176 is between the permanent magnet 158 and the consequent pole 164, and a damper bar 178 is between the permanent magnet 158 and the consequent pole 166. The damper bars 172, 174, 176, 178 shown in FIG. 10 are of an alternate configuration which will work equally well as the configuration of the damper bars 72, 74, 76, 78 shown in FIG. 3.

A damper ring 184 is used on the left end of the rotor 120, and a damper ring 186 is used on the right end of the rotor 120. A damper spacer 188 is used between the permanent magnets 156, 160, and a similar damper spacer 192 (not shown) is used between the permanent magnets 158, 162. The damper spacers 188, 192 may have material removed to form lightening spaces 198, 199 (the latter of which is not shown) therein. A retaining hoop 180 made of non-ferromagnetic material surrounds the rest of the rotor 120 similarly to the retaining hoop 80 shown in FIGS. 3-5.

Figure 3:
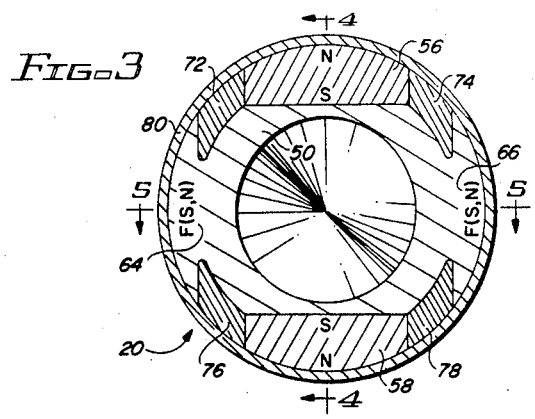
FIG. 3 is a view of left end of the rotor of the machine of FIG. 1 with the end rings removed.
Figure 4:
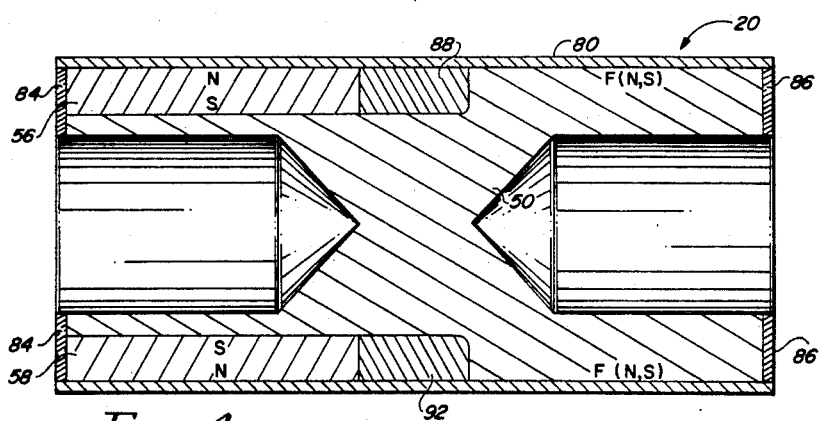
FIG. 4 is a first cross-sectional view of the rotor of FIG. 3.
Figure 5:
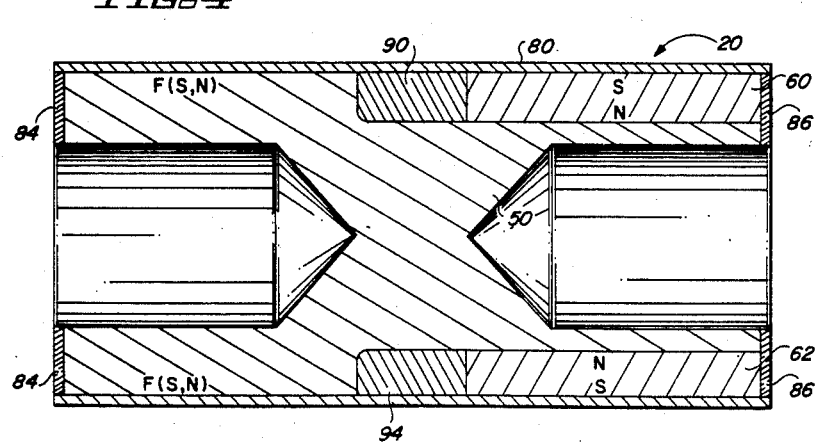
FIG. 5 is a second cross-sectional view of the rotor of FIG. 3.

Fabrication of the rotor 120 is simpler than the rotor 20 (FIGS. 3-5). Transport distance for the control flux is shorter, and more control flux can be transported between sections. Even more significant is the fact that rotor stiffness is enhanced.

Figure 12:
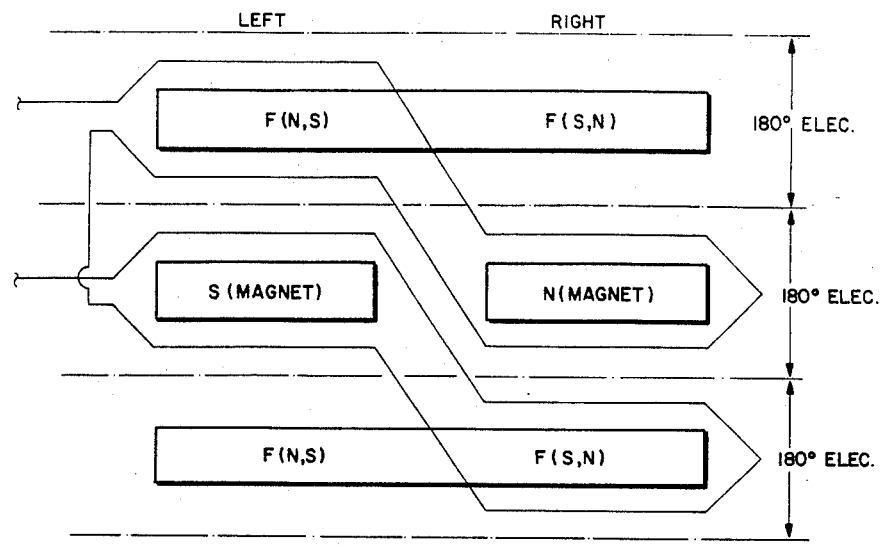
FIG. 12 is a schematic drawing showing the relationship of the magnetic poles and the ferromagnetic poles, and a typical stator conductor at maximum flux linkage of the rotor for a machine having the rotor of FIGS. 10 and 11.

Since the rotor poles are aligned rather than being displaced by 180 electrical degrees (for a four pole machine 90 mechanical degrees), the required displacement is provided by jogging stator windings. Rather than proceeding in a straight axial direction between the left and right stators as shown in FIG. 9, the stator winding is jogged or pitched over to enter a slot position displaced by 180 electrical degrees. Such a relationship of rotor poles to a typical stator winding conductor at the maximum flux linkage position of the rotor 120 is shown in FIG. 12.

In some applications it is convenient to have independent right and left windings with a relationship that allows the two windings to be series-connected to achieve the same result as the jogged winding installation.

In the rotor 120 less iron is required in the ferromagnetic yoke 150 than in the ferromagnetic yoke 50 of the rotor 20 of FIGS. 3-5. A flux component due to the magnet flows in iron needed to transport axially directed flux flow. However, the component from the South magnets is neutralized by the flux from the North magnets. Therefore, the axial ferromagnetic yoke 150 length under the ferromagnetic poles may be shortened and the pole ends tapered (as by the lightening holes 196, 197). This reduces weight and inertia of the rotor 120.

To suppress slot harmonics and cogging, skewed stator slots need not be used because a similar effect can be achieved by reducing the 180 electrical degree displacement by the skew pitch that was desired. Generally, this would be one slot pitch. A similar strategy can be used with the machine of FIGS. 1-5 with the option that the displacement reduction desired may be implemented in either the stator or the rotor sections.

Referring once again to FIG. 6, it is evident that perfect symmetry of the left and right halves results in nodes A and B being equipotential nodes, which may be joined by a low reluctance magnetic bus with no discernible effect but to simplify analysis. This makes possible the single section machines shown in FIGS. 13-16.

The machine shown in FIGS. 13-14 is a radial air gap machine having a rotor 220 and a stator 222. Stator windings 230 are wound into the stator core 224, and a control coil 240 is wound onto a bobbin 242. The control coil 240 is carried on a ferromagnetic frame 244 surrounding the stator core 224 and extending radially inwardly to surround a portion of a ferromagnetic yoke 250 making up the frame of the rotor 220.

The ferromagnetic yoke 250 is attached to a shaft stub 262, and the rotor 220 is rotatable. A pair of permanent magnets 256, 258 are mounted on the ferromagnetic frame 250. Located intermediate the permanent magnets 256, 258 are consequent poles 264 and 266. A damper bar 272 is between the permanent magnet 256 and the consequent pole 264, a damper bar 274 is between the permanent magnet 256 and the consequent pole 266, a damper bar 276 is between the permanent magnet 258 and the consequent pole 264, and a damper bar 278 is between the permanent magnet 258 and the consequent pole 266. A retaining hoop 280 surrounds the rotor 220. With the exception of the added control coil 240 and the ferromagnetic frame 244, the machine shown in FIGS. 13 and 14 is a permanent magnet radially configured consequent pole machine.

Figures 15, 16:
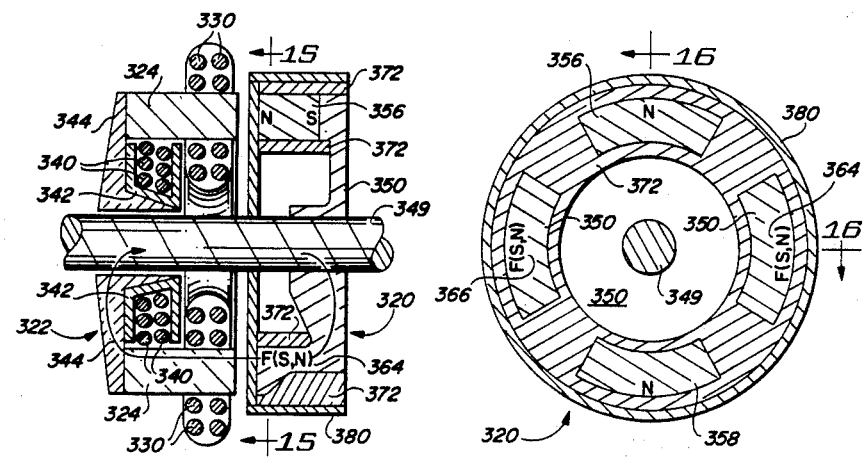
FIG. 15 is a cross-sectional view of the rotor of an alternate embodiment of the present invention.
FIG. 16 is a cutaway view of the alternate embodiment of the present invention, the rotor of which is shown in FIG. 15, showing the construction of an axially configured hybrid excited machine comprising one permanent magnet machine in tandem with an electromagnet machine field or control coil.

The machine shown in FIGS. 15–16 is an axial air gap machine having a rotor 320 and a stator 322. Stator windings 330 are wound onto the stator core 324, and a control coil 340 is wound onto a bobbin 342. The control coil 340 is carried on a ferromagnetic frame 344 adjacent to the stator core 324 on the side of the stator core 324 away from the rotor 320. The ferromagnetic frame 344 then extends radially inwardly to surround a portion of a ferromagnetic shaft 349.

A ferromagnetic yoke 350 is attached to the ferromagnetic shaft 349, and the rotor 320 is rotatable. A pair of permanent magnets 356, 358 are mounted on the ferromagnetic frame 350 and in a damper cage 372. Located intermediate the permanent magnets 356, 358 are consequent poles 364 and 366. The damper cage 372 surrounds the permanent magnets 356, 358 and the consequent poles 364, 366. A retaining hoop 380 surrounds the rotor 320. With the exception of the added control coil 340 and the ferromagnetic frame 344, the machine shown in FIGS. 15 and 16 is an axial configured permanent magnet consequent pole machine.

It may thus be appreciated that the present invention presents several configurations for a hybrid excited generator having the advantages of both electromagnetic excited generators and permanent magnet generators, with the disadvantage of neither. The hybrid excited generator, which is brushless, produces a voltage output which is variable over a wide range at a given speed, or which may be kept constant while driven at various speeds. The machine is relatively compact and light in weight, and economical both in construction and in operation.

It will be apparent to those skilled in the art that a number of changes, modifications, or alterations to the present invention as described herein may be made, none of which depart from the spirit of the present invention. All such changes, modifications, and alterations should therefore be seen as within the scope of the present invention.

What is claimed is:

1. An electrical machine, comprising:
   a rotor having a plurality of poles, said poles including alternate high reluctance permanent magnet poles and low reluctance consequent ferromagnetic poles;
   a stator assembly having a polyphase winding thereon;
   a control coil mounted on said stator assembly for generating a control flux proportional to direct current supplied to said control coil, said control flux entering the stator assembly over the entire axial length thereof; and
   a ferromagnetic frame for completing the path of said control flux generated by said control coil.

2. An axial gap consequent pole electrical machine, comprising:
   a rotor having a first plurality of poles thereon, said poles being alternating high reluctance poles and low reluctance poles;
   a first stator assembly having a polyphase winding thereon for generating an output voltage, said first stator assembly being mounted about said rotor and producing an output voltage when said rotor is turned;
   means for providing a variable control flux to said first plurality of poles on said rotor to vary said output voltage comprising a voltage control coil for generating a control flux proportional to direct current supplied to said control coil, said output voltage varying in response to said control flux; and
   a ferromagnetic frame and a ferromagnetic shaft through said rotor, wherein said ferromagnetic frame completes the path of said control flux through said ferromagnetic shaft, through said rotor including said first plurality of poles, and through said first stator assembly.

3. An electrical machine, comprising:
   a consequent pole rotor having a first plurality of poles thereon, said poles being alternating high reluctance poles and low reluctance poles;
   a first stator assembly having a polyphase winding thereon for generating an output voltage, said first stator assembly being mounted about said rotor and producing an output voltage when said rotor is turned; and
   means disposed on said first stator assembly for providing a variable control flux to said first plurality of poles on said rotor to vary said output voltage.

4. An electrical machine as defined in claim 3, wherein said providing means comprises:
   a voltage control coil for generating a control flux proportional to direct current supplied to said control coil; and
   a ferromagnetic frame for completing the path of said control flux as it passes through said first plurality of poles, said output voltage varying in response to said control flux.

5. A radial air gap consequent pole electrical machine, comprising:
   a rotor having a first plurality of poles thereon, said poles being alternating high reluctance poles and low reluctance poles;
   a first stator assembly having a polyphase winding thereon for generating an output voltage, said first stator assembly being mounted about said rotor and producing an output voltage when said rotor is turned; and
   means disposed on said first stator assembly for providing a variable control flux to said first plurality of poles on said rotor to vary said output voltage, said providing means comprising a voltage control coil for generating a control flux proportional to direct current supplied to said control coil and a ferromagnetic frame for completing the path of said control flux as it passes through said first plurality of poles, said output voltage varying in response to said control flux.

6. An electrical machine as defined in claim 5, wherein said ferromagnetic frame completes the path of said control flux through said first stator assembly, and through said rotor including said first plurality of poles.

7. An axial gap consequent pole electrical machine, comprising:

a rotor having a first plurality of poles thereon, said poles being alternating high reluctance poles and low reluctance poles;

a first stator assembly having a polyphase winding thereon for generating an output voltage, said first stator assembly being mounted about said rotor and producing an output voltage when said rotor is turned; and means disposed on said first stator assembly for providing a variable control flux to said first plurality of poles on said rotor to vary said output voltage, said providing means comprising a voltage control coil for generating a control flux proportional to direct current supplied to said control coil and a ferrogmagnetic frame for completing the path of said control flux as it passes through said first plurality of poles, said output voltage varying in response to said control flux.

8. An electrical machine as defined in claim 7, wherein said high reluctance poles are permanent magnet poles and said low reluctance poles are consequent ferromagnetic poles.

9. An electrical machine as defined in claim 8, wherein said permanent magnet poles are made of high magnetic energy product material.

10. An electrical machine as defined in claim 9, wherein said high magnetic energy product material is a member of the group comprising samarium cobalt and neodymium iron.

11. An electrical machine as defined in claim 2, wherein said rotor comprises:

a ferromagnetic yoke, said permanent magnets being mounted on said ferromagnetic yoke, said ferromagnetic yoke having projections between said permanent magnets, said projections being said ferromagnetic poles.

12. An electrical machine as defined in claim 11, additionally comprising:

a second stator assembly having a polyphase winding thereon, said polyphase winding of said first stator assembly being electrically connected to said polyphase winding of said second stator assembly to provide said output voltage, wherein said first plurality of poles are located at one end of said rotor;

a second plurality of poles on said rotor at the other end of said rotor, said second plurality of poles being alternating high reluctance permanent magnet poles mounted on said ferromagnetic yoke and low reluctance poles formed by projections from said ferromagnetic yoke, said first plurality of poles being within said first stator assembly, and said second plurality of poles being within said second stator assembly.

13. An electrical machine as defined in claim 12, wherein said providing means comprises:

a voltage control coil for generating a control flux proportional to direct current supplied to said control coil, said control coil being located between said first stator assembly and said second stator assembly and around said rotor; and a ferromagnetic frame surrounding said first stator assembly, said control coil, and said second control coil, said ferromagnetic frame completing the path of said control flux as it passes through said first and second set of poles, said output voltage varying in response to said control flux.

14. An electrical machine, comprising:

a first stator assembly having a polyphase winding thereon;

a second stator assembly having a polyphase winding thereon, said polyphase winding of said first stator assembly being electrically connected to said polyphase winding of said second stator assembly to provide an electrical output;

a rotor having thereon a first set of poles at one end thereof, and a second set of poles at the other end thereof, said first and second sets of poles each including alternating high reluctance permanent magnet poles and low reluctance consequent ferromagnetic poles, said first set of poles being located within said first stator assembly and said second set of poles being located within said second stator assembly, said electrical output being provided when said rotor is rotated;

a voltage control coil for generating a control flux proportional to direct current supplied to said control coil, said control coil being located between said first stator assembly and said second stator assembly and around said rotor; and a cylindrical ferromagnetic frame surrounding said first stator assembly, said control coil, and said second stator assembly, said ferromagnetic frame completing the path of said control flux as it passes through said first and second set of poles, said output voltage varying in response to said control flux.

15. An electrical machine as defined in claim 14, wherein said first set of poles and second set of poles are so arranged and configured as to have permanent magnet poles in said first set of poles aligned with ferromagnetic poles in said second set of poles, and vice-versa, with conductors from said polyphase winding of said first stator assembly passing straight through to said polyphase winding of said second stator assembly.

16. An electrical machine as defined in claim 15, wherein cogging is suppressed by skewing said conductors from said polyphase winding of said first stator assembly by one slot pitch rather than going straight through to said polyphase winding of said second stator assembly.

17. An electrical machine as defined in claim 15, wherein cogging is suppressed by skewing said first set of poles one slot pitch away from the configuration described in claim 15.

18. An electrical machine as defined in claim 14, wherein said first set of poles and said second set of poles are so arranged and configured as to have permanent magnet poles in said first set of poles aligned with permanent magnet poles in said second set of poles, and ferromagnetic poles in said first set of poles aligned with ferromagnetic poles in said second set of poles, with conductors from said polyphase winding of said first stator assembly being pitched over by 180 electrical degrees to said polyphase winding of said second stator assembly.

19. An electrical machine as defined in claim 18, wherein each ferromagnetic pole in said first set of poles aligned with a ferromagnetic pole from said second set of poles is formed of a unitary segment of ferromagnetic material.

20. An electrical machine, comprising:

a rotor having a plurality of poles, said poles including alternate high reluctance permanent magnet poles and low reluctance consequent ferromagnetic poles;

a first stator assembly having a polyphase winding thereon;

a control coil mounted on said first stator assembly for generating a control flux proportional to direct current supplied to said control coil; and a ferromagnetic frame for completing the path of said control flux generated by said control coil.

21. A method of assembling an electrical machine to provide a variable voltage, comprising the steps of:

providing a stator assembly having a polyphase winding thereon;

rotatably installing within said stator assembly a rotor having a plurality of high reluctance permanent magnet poles alternating with a plurality of low reluctance consequent ferromagnetic poles; and providing a direct current control coil on said stator assembly to apply a constant flux to the poles of said rotor with a direct current control coil so that when the current supplied to said control coil is varied, the control flux applied to the poles of said rotor is varied to cause the voltage supplied by said electrical machine to vary.

22. An electrical machine, comprising:

a permanent magnet rotor including a ferromagnetic yoke having a pair of oppositely disposed radially outwardly extending consequent ferromagnetic poles, a pair of permanent magnets oppositely disposed about the periphery of said ferromagnetic yoke generally between the consequent ferromagnetic poles thereof, non-ferromagnetic conducting material damper bars generally disposed between adjacent permanent magnets and ferromagnetic projections, and a retaining hoop disposed around said permanent magnets, said ferromagnetic projections, and said damper bars;

a polyphase winding stator operably associated with said rotor to produce an output voltage when said rotor is turned; and means operably associated with said stator to control the output voltage therefrom.

23. The electrical machine of claim 22 wherein said output voltage control means is a control coil disposed on said stator to provide a variable control flux to said permanent magnet rotor.

24. The electrical machine of claim 23 wherein said control coil is mounted at one end of said polyphase winding stator in juxtaposition to at least a portion of said ferromagnetic yoke.

25. The electrical machine of claim 22 wherein said polyphase winding stator is concentrically disposed about said rotor.

26. The electrical machine of claim 22 wherein said polyphase winding stator is axially aligned with said rotor.

27. An electrical machine, comprising:

a permanent magnet rotor including a ferromagnetic yoke having a pair of oppositely disposed radially outwardly extending consequent ferromagnetic poles, a pair of permanent magnets oppositely disposed about the periphery of said ferromagnetic yoke generally between the consequent ferromagnetic poles thereof, non-ferromagnetic conducting material damper bars generally disposed between adjacent permanent magnets and ferromagnetic projections, and a retaining hoop disposed around said permanent magnets, said ferromagnetic projections, and said damper bars;

a stator having a first polyphase winding core disposed about one end of said rotor and a second polyphase winding core disposed about the other end of said rotor and electrically connected to said first polyphase winding core; and a voltage control coil mounted on said stator between said first and second polyphase winding cores to generate a control flux proportional to direct current supplied to said voltage control coil.

28. A method of developing a variable voltage from an electrical machine, comprising the steps of:

rotating a rotor having a plurality of high reluctance permanent magnet poles alternating with a plurality of low reluctance consequent ferromagnetic poles within a stator assembly having a polyphase winding thereon;

applying a constant flux to the poles of said rotor with a direct current control coil; and varying the current supplied to said control coil to vary the control flux applied to the poles of said rotor to cause the voltage supplied by said electrical machine to vary.

29. An electrical machine comprising:

a permanent magnet rotor including an axially extending ferromagnetic shaft, a ferromagnetic yoke disposed around one end of said axially extending ferromagnetic shaft and having a pair of oppositely disposed radially outwardly extending consequent ferromagnetic poles, a pair of permanent magnets oppositely disposed about the periphery of said ferromagnetic yoke generally between the consequent ferromagnetic poles thereof, non-ferromagnetic conducting material damper bars generally disposed between adjacent permanent magnets and ferromagnetic projections, and a retaining hoop disposed around said permanent magnets;

a polyphase winding stator disposed about the other end of said axially extending ferromagnetic shaft; and a voltage control coil mounted on said stator opposite to said rotor to provide a variable control flux to said permanent magnet rotor.

30. An electrical machine, comprising:

a permanent magnet rotor having a first set of alternating high reluctance permanent magnet poles and low reluctance consequent ferromagnetic poles at one end thereof and a second set of alternating high reluctance permanent magnet poles and low reluctance consequent ferromagnetic poles at the other end thereof;

a stator having a first polyphase winding core disposed about the first set of poles at one end of said rotor and a second polyphase winding core disposed about the second set of poles at the other end of said rotor and electrically connected to said first polyphase winding core; and a voltage control coil mounted on said stator between said first and second polyphase winding cores to generate a control flux proportional to direct current supplied to said voltage control coil.

31. The electrical machine of claim 30 wherein the high reluctance permanent magnet poles of the first set of poles are axially aligned with the high reluctance permanent magnet poles of the second set of poles.

32. The electrical machine of claim 30 wherein the high reluctance permanent magnet poles of the first set of poles are axially aligned with the low reluctance consequent ferromagnetic poles of the second set of poles.

33. The electrical machine of claim 32 wherein the first polyphase winding of said stator is axially aligned with the second polyphase winding of said stator.

34. The electrical machine of claim 31 wherein the first polyphase winding of said stator is displaced 180 electrical degrees from the second polyphase winding of said stator.

* * * * *